United States Patent Office 2,982,693
Patented May 2, 1961

2,982,693

PROCESS OF STEROID FERMENTATION

Joseph Jacob Goodman, Nanuet, and Mary Matrishin, Pearl River, N.Y., assignors to American Cyanamid Company, New York, N.Y., a corporation of Maine No Drawing. Filed Aug. 4, 1958, Ser. No. 753,159

8 Claims. (Cl. 195—51)

This invention relates to an improved process for the fermentation of steroids. More particularly, it relates to an improved process for the production of 16α,17α-dihydroxy-20-keto steroids of the pregnane series by fermentation with *Streptomyces roseochromogenus*.

Recently, steroids of the pregnane series having present a hydroxyl group in the 16-position have come into commercial usage. Such steroids are described in United States Patent 2,789,118 and one (9α-fluoro-16α-hydroxy prednisolone) is marketed under the generic name triamcinolone. In the preparation of these compounds from simpler steroids, it is necessary to put a hydroxyl group in the 16-position. This step can be accomplished by fermentation with *Streptomyces roseochromogenus* on a small scale using glass, stainless steel or glass lined equipment. However, when attempts are made to carry out the reaction in large scale iron tanks, an undesirable by-product is produced as the major product of the fermentation.

An object of this invention is to provide a new and novel process which is superior to current methods of preparing such 16α,17α-dihydroxy-20-keto steroids of the pregnane series in the presence of iron, whereby improved yields of the desired compounds can be recovered free of undesirable by-products.

A further object of this invention is to provide a process for preparing 16-hydroxylated compounds of the 17α-hydroxy-20-keto steroids of the pregnane series in iron tanks, thus eliminating the need for expensive stainless steel or glass-lined equipment and facilitating the economical commercial production of the desired compounds free from unwanted by-products.

In order to realize the objects of this invention, the following procedures were carried out:

(A) Stopping the fermentation in any particular instance, before an appreciable amount of an undesirable by-product is formed, could not be used since such by-products begin to form shortly after steroid addition.

(B) The use of anodic protection, utilizing magnesium metal, zinc metal, magnesium alloy and galvanized wire failed to prevent by-product formation.

(C) The use of chelating agents such as $Na_4$ Versene and a specific iron chelating agent Versene $Fe_3$ Specific (Bersworth Chemical Co.), added to the fermentation medium in the proportions of 0.01% and 0.05% was not successful.

(D) The use of iron complexing agents such as 1000–5000 p.p.m. of sodium citrate (trisodium salt), 200–1000 p.p.m. of potassium thiocyanate, 10–100 p.p.m. of sodium fluoride and 7 p.p.m. of phenyl mercaptooxadiazole did not prevent by-product formation.

(E) The use of alcohols such as methanol and ethanol (at 2% to 6% levels) which are known to increase the tolerance of *Aspergillus niger* to trace elements in the medium used for the production of citric acid did not inhibit by-product formation.

We have now found unexpectedly that an excess of phosphate ions such as, for example, that produced by dipotassium hydrogen phosphate $K_2HPO_4$ is highly effective in preventing the formation of undesirable by-products.

The phosphates found useful in our process are soluble phosphates defined as those phosphorus compounds and their polymers having a valence of five and whose oxyacids have $P_2O_5$ as their anhydride. Examples of these are orthophosphates, pyrophosphates, metaphosphates and polyphosphates as shown hereinafter in the examples.

Another unexpected discovery is the fact that the presence of a small amount of a soluble phosphate in the fermentation medium above that sufficient to combine with calcium and magnesium and secondly with any iron present prevented the formation of unwanted by-products. Calcium and magnesium form insoluble phosphates so confirmation of the theory that soluble phosphates are inactivated (by precipitation) is obtained by carrying on fermentations in media containing no added calcium or magnesium. When calcium carbonate, magnesium carbonate or calcium chloride is added to such media in the presence of iron undesirable by-product formation occurs.

In the process of the present invention, the 17α-hydroxy-20-keto steroids of the pregnane series used as starting material can have hydroxyl groups present, such as in the 21-position. These hydroxyl groups can be acylated, and the esters used in the present process in like manner.

In the present application, the abbreviations used have the following definitions: F2=9α-fluoro-11β,17α,21-trihydroxy-4-pregnene-3,20-dione; F3=9α-fluoro-11β,16α,17α,21-tetrahydroxy-4-pregnene-3,20-dione; F3a=undesired compound (D-homo steroid).

The examples hereinafter show that it is desirable to have phosphate ions present before the steroid substrate is added to the fermentation medium, as once the undesirable compound (D-homo steroid) is formed, it is not reconverted to the desired compound.

EXAMPLE 1

An inoculum of *S. roseochromogenus* (ATCC No. 3347) is prepared using sucrose, 30 grams; corn steep liquor, 20 grams; ammonium sulfate [$(NH_4)_2SO_4$] 2 grams; calcium carbonate, 7 grams and water to make 1000 ml. A sample of 100 ml. of this medium is placed in each of a series of 500 ml. Erlenmeyer flasks and sterilized by autoclaving under fifteen pounds per square inch pressure. A loopful of spores from an agar slant of *S. roseochromogenus* is added to the sterile medium in each flask. The flask containing the inoculated medium is incubated at 26.5° C. for twenty-four hours on a rotary shaker.

A 2 ml. portion of the vegetative inoculum is placed in an Erlenmeyer flask containing 50 ml. of sterilized fermentation medium prepared as follows: starch, 40 grams; corn steep liquor, 25 grams; calcium carbonate, 5 grams; and water to make 1000 ml. Lard oil is added separately to each fermentation flask, 0.2% v./v. 50 milliliter portions of this medium are placed in 250 Erlenmeyer flasks and 0.1 ml. lard oil added to each flask. The flasks and their contents are then sterilized by autoclaving for twenty minutes under fifteen pounds per square inch pressure. The 50 ml. sample of the sterilized fermentation medium inoculated with two ml. of the vegetative inoculum is incubated for twenty-four hours at 26.5° C. on a rotary shaker operating at 180 revolutions per minute.

At the termination of a twenty-four hour growth period, 9α-fluoro-11β,17α,21-trihydroxy-4-pregnene-3,20-dione is added to the flasks in dimethyl-formamide solution so that the final concentration of the steroid substrate in the flasks is 500 γ/ml., and the dimethylformamide concentration in the flasks is not more than 2%. Fermentation is then continued at 26.5° C., and samples are removed periodically. The mash is subjected to differential solvent extraction to separate the starting material from the product obtained. The steroid content of the extracts is then assayed polargraphically for content of original substrate, the desired product (9α-fluoro-11β,16α,17α,21-tetrahydroxy-4-pregnene-3,20-dione) or undesired D-homo steroid.

An aliquot portion is also extracted with ethyl acetate, the solvent removed and the dried residue taken up in another solvent and paper chromatographed in a variety of systems. Under the conditions described above, 500 γ/ml. of starting steroid is converted into the desired 9α-fluoro-11β,16α,17α,21-tetrahydroxy-4-pregnene-3,20-dione at the rate of 90-100% in forty-eight hours with small loss in total steroid content.

The procedure outlined above is followed, with the exception that a four inch piece of fourteen gauge iron wire similar to that used for thermocouples and bent to fit to the inside of the Erlenmeyer flask containing the fermentation medium is added to the medium before sterilization. The major product obtained is not 9α-fluoro-11β,16α,17α,21-tetrahydroxy-4-pregnene-3,20-dione, but is an unwanted by-product having the D-homo structure in the Ring D. The presence of iron gives an undesired product instead of the desired steroid.

The desired product, 9α-fluoro-11β,16α,17α21-tetrahydroxy-4-pregnene-3,20-dione (F3), can be distinguished from the undesired D-homo steroid (F3a) in Bush type paper chromatographic systems by its greater polarity, i.e., it is less mobile.

*Mobility in terms of $R_f$*

| Substance | System A | System B | System C | System D |
|---|---|---|---|---|
| | Benzene, 4 Parts Dioxane, 1 Part Glacial Acetic Acid, 1 Part Water, 2 Parts | Benzene, 2 Parts Ethanol, 1 Part Water, 2 Parts | Benzene, 2 Parts Ethanol, 1 Part Water, 1 Part | Benzene, 2 Parts Acetone, 1 Part Water |
| F3 | 0.22 | 0.19 | 0.24 | 0.52 |
| F3a | 0.13 | 0.099 | 0.12 | 0.30 |

EXAMPLE 2

A further experiment is carried out as described in Example 1 using the same inoculum and fermentation medium and conditions with one variation in that different amounts of $KH_2PO_4$ are added to the fermentation medium before sterilization.

| | Iron Wire Absent | | Iron Wire Present | |
|---|---|---|---|---|
| $KH_2PO_4$, g./l. | Polarograph—Conversion, Percent | Chromatograph | Polarograph—Conversion, Percent | Chromatograph |
| 0 | 84 | | 84 | F3a.[3] |
| 1 | 66 | F2[1] and F3[2] | 90 | F2[1], F3[2] and F3a.[3] |
| 3 | 41 | F2[1] and F3[2] | 40 | F2[1], F3.[2] |
| 5 | 30 | F2[1] and F3[2] | 57 | F2[1], F3.[2] |

[1] F2=9α-fluoro-11β, 17α, 21-trihydroxy-4-pregnene-3,20-dione.
[2] F3=9α-fluoro-11β, 16α, 17α, 21-tetrahydroxy-4-pregnene-3, 20-dione.
[3] F3a=Undesired compound (D-homo steroid).
Conversion=converting starting material to new product.

Chromatographic assays above show the general trend that as $KH_2PO_4$ is added to the medium where iron is present, the conversion of F2 to F3 is slowed down, but the presence of the undesired compound (D-homo steroid) is reduced.

Further experiments at both the 500 and 1000 γ/ml. substrate levels showed a similar effect. The conversion of F2 is retarded. At the 500 γ/ml. level, one gram/liter of $KH_2PO_4$ prevents formation of the undesired D-homo steroid and at 1000 γ/ml. substrate, three grams per liter of $KH_2PO_4$; formation of D-homo steroid is prevented.

EXAMPLE 3

An experiment similar to Example 2 is carried out using $K_2HPO_4$ as the source of phosphate. In this reaction conversion proceeded favorably due to the higher pH during the conversion and by-product (F3a) formation in the presence of iron is eliminated. The results obtained are as follows:

| | Iron Wire Absent | | Iron Wire Present | |
|---|---|---|---|---|
| $K_2HPO_4$, gm./l. | Conversion,[1] percent | Identity [2] | Conversion,[1] percent | Identity [2] |
| 0 | 100 | Trace F2, Strong F3, Trace F3a | 92 | F3 and some F3a.[3] |
| 1 | | do | 97 | F3 and faint F3a. |
| 3 | | do | 98 | F3. |
| 5 | 100 | do | 100 | F3.[4] |

[1] Conversion—determined by a polarographic method.
[2] Determined by paper chromatography.
[3], [4] Determined by partition column chromatography, also.
[3] Predominantly F3a. Some F2 and F3 present.
[4] Only F3 was found.

EXAMPLE 4

Following the procedure of Example 1 with the variation that under sterile conditions there is added three grams per liter $K_2HPO_4$ after the conversion of 9α-fluoro-11β,17α,21-trihydroxy-4-pregnene-3,20-dione to 9α-fluoro-11β,16α,17α,21-tetrahydroxy-4-pregnene-3,20-dione has proceeded in the usual manner for twenty-four hours. Quantitative paper chromatographic assays show the following results:

*Iron wire present in all cases*

NO PHOSPHATE ADDED

| | Twenty-Four Hours After Substrate Addition | Forty-Eight Hours After Substrate Addition | |
|---|---|---|---|
| | Percent | | Percent |
| F2 | 39 | F2 | |
| F3 | 24 | F3 | |
| F3a | 37 | F3a | |

[3 g. $K_2HPO_4$/l.]

PHOSPHATE ADDED TWENTY-FOUR HOURS AFTER SUBSTRATE ADDITION

| | |
|---|---|
| F2 | 17 |
| F3 | 50 |
| F3a | 33 |

NOTE:
1. F3a formed by 24 hours in the presence of iron increases by 48 hours (37%-78%). The F3 formed by 24 hours appears to decrease (34%-15%).
2. When phosphate is added, the F3a formed by 24 hours remains constant (37%-33%). The F3 increases (24%-50%).

EXAMPLE 5

Experiments were carried out in a manner similar to the preceding examples except that different substrates were used. The following shows the products obtained in the absence of iron, in the presence of iron, and in the presence of iron and dipotassium phosphate.

| Substrate | No Iron Wire | Iron Wire | Iron and 3 g./l. $K_2HPO_4$ |
|---|---|---|---|
| Hydrocortisone | 16α-hydroxy-hydrocortisone. | Corresponding D-homo compound. | 16α-hydroxy hydrocortisone. |
| 11α-hydroxy Substance S | 11α, 16α-di-hydroxy Substance S. | ___do___ | 11α, 16α-di-hydroxy Substance S. |
| Δ¹-hydrocortisone | 16α-hydroxy Δ¹-hydrocortisone. | ___do___ | 16α-hydroxy Δ¹-hydrocortisone. |

EXAMPLE 6

The following experiments were carried out as in Example 1 using various phosphate compounds and testing at a "P" (phosphate) level equal to 3 g./l $K_2HPO_4$.

| | No Iron Wire | Iron Wire | Iron Wire and Phosphate |
|---|---|---|---|
| Ortho Phosphates: | | | |
| $Na_2HPO.12H_2O$ | F3 | F3a | F3 |
| $(NH_4)_2HPO_4$ | F3 | F3a | F3 |
| $Na_3PO_4.12H_2O$ | F3 | F3a | F3 |
| Meta Phosphate: | | | |
| $(NaPO_3)_n$ | F3 | F3a | F3 |
| Pyro Phosphate: | | | |
| $Na_4P_2O_7.10H_2O$ | F3 | F3a | F3 |
| Poly Phosphates: | | | |
| $Na_5P_4O_{13}$ | F3 | F3a | F3 |
| Sodium hexa meta phosphate polymer | F3 | F3a | F3 |

EXAMPLE 7

A fermentation medium is prepared containing soy bean oil meal (5 grams), corn steep liquor (20 grams), cerelose (30 grams), calcium carbonate (7 grams) and water to make 1000 ml. 50 ml. Aliquot portions of the above medium are placed in 250 ml. Erlenmeyer flasks and 0.1 ml. of lard oil added to each flask. The flasks and their contents are sterilized in an autoclaving for twenty minutes under fifteen pounds per square inch pressure. An inoculum of S. roseochromogenus such as described in Example 1 is then added to each flask of medium described above. The flasks are allowed to ferment following the addition of the steroid substrate 9α-fluoro-11β,17α,21-trihydroxy-4-pregnene-3,20-dione as described in Example 1. The product obtained in almost quantitative yield is 9α-fluoro-11β,16α,17α,21-tetrahydroxy-4-pregnene-3,20-dione.

In a fermentation reaction similar to that described except that a four inch piece of fourteen gauge iron wire is added to the fermentation medium before sterilization, the product obtained is the undesired by-product of indefinite structure having the D-homo structure in ring D of the steroid nucleus.

EXAMPLE 8

To demonstrate that there is a proportionality between the amount of calcium and the amount of phosphate necessary to prevent F3a formation, the following experiment in which iron wire was present in all variables was run. To a basal medium prepared according to the formula starch 40 gm./l. and corn steep liquor 25 gm./l., varying amounts of $CaCO_3$ and $K_2HPO_4$ were added. Fifty ml. aliquots of medium were placed in 250 ml. Erlenmeyer flasks containing the iron wire, 0.1 ml. of lard oil was added to each flask, and the contents were sterilized by autoclaving for twenty minutes at 15 p.s.i. The flasks were inoculated with S. roseochromogenus, and the conversion was carried out as in Example 1. The presence or absence of D-homo steroid formation are illustrated with the following table by + and − signs, respectively.

D-homo steroid formation

| $CaCO_3$ Added, Gm./l. | $K_2HPO_4$ Added | | |
|---|---|---|---|
| | 0.5 gm./l. | 1.0 gm./l. | 3.0 gm./l. |
| 1.0 | − | − | − |
| 3.0 | − | − | − |
| 5.0 | + | + | − |

At 1 and 3 gm./l., $CaCO_3$ all phosphate levels effectively prevent the undesirable D-homo steroid formation. At 5 gm./l. $CaCO_3$, it requires 3 gm./l. of phosphate to prevent D-homo steroid formation.

EXAMPLE 9

In an intermediate sized 30 liter tank made of stainless steel, no or negligible amounts of the D-homo steroid is formed. When, however, lengths of iron wire are added to the stainless steel tanks to provide a liquid volume surface area exposure equivalent to that found in the larger tanks, and the conversion is then carried out in such modified tanks, the D-homo steroid is formed. The addition of 3 gm./l. $K_2HPO_4$ to the medium in these modified tanks results in the elimination of the D-homo steroid.

A typical build-up cycle for these pilot plant experiments is as follows:

Spores of S. roseochromogenus grown on a suitable agar slant medium (such as Bennett's agar) are transferred to a 100 ml. of sterile medium in a 500 ml. flask. The medium consists of corn steep liquor, 20 g./l.; $CaCO_3$, 7 g./l.; sucrose, 30 g./l. and $(NH_4)_2SO_4$, 2 g./l.

The inoculated medium is shaken on a reciprocating shaker for twenty-four hours at 27° C., after which the total contents are transferred to 6 liters of a similar medium contained in a 9 liter bottle. The bottle is aerated with 0.3 c.f.m. of air and incubated for twenty-nine hours at 27° C. The inoculum is then used to inoculate the aerated tanks 30 liters (per 60 liter tank) at the rate of one liter of inoculum per 30 liters of medium. Media in the 30 liter batches consisted of soybean, 20 g./l.; cerelose, 35 g./l.; calcium carbonate, 2.5 g./l. and soybean oil 2.5 ml./l. The alternative medium which can be used consists of corn steep liquor, 20 g./l.; soybean meal 6 g./l.; cerelose, 25 g./l.; calcium carbonate 7 gm./l. and Nopco 2226B (antifoam), 2 ml./l.

After a twenty-four hour growth period, the steroid, F2 dissolved in dimethyl formamide, is added to the medium in tanks at such a rate as to result in a final steroid concentration of 250–400 mg./ml. Chromatographic analyses of the fermentation show that regardless of medium used, with iron exposed in the tanks, the D-homo compound is a substantial or major product. However, with the addition of 3 g./l. $K_2HPO_4$ to the medium, little or no D-homo steroid is produced, and the desired 16-hydroxy steroid is obtained.

In another experiment, aliquots of twenty-four hour growths in 1000 gallon iron tanks are aseptically transferred to the 30 gallon stainless steel fermentors, steroid is added, and the fermentation allowed to proceed. In this experiment, the D-homo steroid is a substantial product showing that there is enough iron picked up from the large tanks to subsequently result in D-homo steroid formation in the stainless steel tanks.

We claim:

1. An improved process for the preparation of 9α-fluoro - 11β,16α,17α,21 - tetrahydroxy - 4 - pregnene-3,20-dione in the presence of iron which comprises fermenting 9α - fluoro - 11β,17α,21 - trihydroxy - 4 - pregnene-3,20-dione in a medium capable of growing Streptomyces roseochromogenus in the presence of 3–5 gms. per liter of dipotassium hydrogen phosphate.

2. An improved process for the preparation of 9α-fluoro - 11β,16α,17α,21 - tetrahydroxy - 4 -pregnene-3,20-dione in the presence of iron which comprises fermenting 9α - fluoro - 11β,17α,21 - trihydroxy - 4 -pregnene-3,20-dione in a medium capable of growing *Streptomyces roseochromogenus* in the presence of at least 3–5 gms. per liter of potassium dihydrogen phosphate.

3. An improved process for the preparation of 9α-fluoro - 11β,16α,17α,21 - tetrahydroxy - 4 - pregnene-3,20-dione in the presence of iron which comprises fermenting 9α - fluoro - 11β,11α,21 - trihydroxy - 4 - pregnene-3,20-dione in a medium capable of growing *Streptomyces roseochromogenus* in the presence of at least 3–5 gms. per liter of dibasic ammonium hydrogen phosphate.

4. In a process for the preparation of 16α,17α-dihydroxy-20-keto steroids of the pregnane series by fermentation of the corresponding 17α-hydroxy-20-keto steroid with a specie of the genus Streptomyces in the presence of both iron as a trace element and phosphate radical in not more than 0.1%, the improvement which comprises fermenting with *Streptomyces roseochromogenus* in the presence of at least 3 grams per liter of soluble phosphate.

5. In a process for the preparation of 9α-fluoro-11β,16α,17α,21 - tetrahydroxy - 4 - pregnene - 3,20 - dione by fermentation of 9α-fluoro-11β,17α,21-trihydroxy-4-pregnene-3,20-dione with a specie of the genus Streptomyces in the presence of both iron as a trace element and phosphate radical in not more than 0.1%, the improvement which comprises fermenting with *Streptomyces roseochromogenus* in the presence of at least 3 grams per liter of soluble phosphate.

6. In a process for the preparation of 11β,16α,17α,21-tetrahydroxy-4-pregnene-3,20-dione by fermentation of 11β,17α,21 - trihydroxy - 4 - pregnene - 3,20 - dione with a specie of the genus Streptomyces in the presence of both iron as a trace element and phosphate radical in not more than 0.1%, the improvement which comprises fermenting with *Streptomyces rosechromogenus* in the presence of at least 3 grams per liter of soluble phosphate.

7. In a process for the preparation of 11α,16α,17α,21-tetrahydroxy-4-pregnene-3,20-dione by fermentation of 11α,17α,21 - trihydroxy - 4 - pregnene - 3,20 - dione with a specie of the genus Streptomyces in the presence of both iron as a trace element and phosphate radical in not more than 0.1%, the improvement which comprises fermenting with *Streptomyces roseochromogenus* in the presence of at least 3 grams per liter of soluble phosphate.

8. In a process for the preparation of 11β,16α,17α,21-tetrahydroxy-1,4-pregnadiene-3,20-dione by fermenting of 11β,17α,21 - trihydroxy - 1,4 - pregnadiene - 3,20-dione with a specie of the genus Streptomyces in the presence of both iron as a trace element and phosphate radical in not more than 0.1%, the improvement which comprises fermenting with *Streptomyces roseochromogenus* in the presence of at least 3 grams per liter of soluble phosphate.

References Cited in the file of this patent

UNITED STATES PATENTS

| | | |
|---|---|---|
| 2,649,401 | Haines et al. | Aug. 18, 1953 |
| 2,709,705 | Perlman et al. | May 31, 1955 |
| 2,838,545 | Magerlein et al. | June 10, 1958 |
| 2,855,343 | Fried et al. | Oct. 7, 1958 |
| 2,903,398 | Kita et al. | Sept. 8, 1959 |

OTHER REFERENCES

Perlmans et al.: J.A.C.S., 74, April 20, 1952, p. 2126.
Vischer et al.: Helvetica Chimica Acta, 1954, pp. 321–326.
Fried et al.: J.A.C.S. (1955), 77, p. 4181.

UNITED STATES PATENT OFFICE

CERTIFICATE OF CORRECTION

Patent No. 2,982,693            May 2, 1961

Joseph Jacob Goodman et al.

It is hereby certified that error appears in the above numbered patent requiring correction and that the said Letters Patent should read as corrected below.

Column 4, Example 4, in the table, last column under the heading "Percent", first line, opposite "F2", insert -- 6 --; second line, opposite "F3" insert -- 15 --; third line, opposite "F3a" insert -- 78 --; column 6, line 40, for "areated" read -- aerated --; line 42, for "inocumum" read -- inoculum --; line 44, after "soybean" and before the comma insert -- meal --; column 7, line 11, for "11α" read -- 17α --.

Signed and sealed this 10th day of October 1961.

(SEAL)
Attest:

ERNEST W. SWIDER
Attesting Officer

DAVID L. LADD
Commissioner of Patents

USCOMM-DC